(12) United States Patent
Holly et al.

(10) Patent No.: US 9,581,211 B2
(45) Date of Patent: Feb. 28, 2017

(54) FRICTION MATERIAL AND METHODS OF MAKING AND USING THE SAME

(71) Applicant: GM Global Technology Operations LLC, Detroit, MI (US)

(72) Inventors: Michael L. Holly, St. Clair Shores, MI (US); David B. Antanaitis, Northville, MI (US); Richard A. Kaatz, Milford, MI (US); Mark T. Riefe, Brighton, MI (US); Cara L. Learman, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 128 days.

(21) Appl. No.: 14/099,219

(22) Filed: Dec. 6, 2013

(65) Prior Publication Data

US 2015/0159710 A1   Jun. 11, 2015

(51) Int. Cl.
*F16D 65/12* (2006.01)
*C23C 8/04* (2006.01)
*C23C 8/30* (2006.01)
*C23C 8/32* (2006.01)
*C23C 8/36* (2006.01)
*C23C 8/38* (2006.01)
*C23C 8/02* (2006.01)
*C23C 8/58* (2006.01)
*F16D 65/10* (2006.01)

(52) U.S. Cl.
CPC .............. *F16D 65/127* (2013.01); *C23C 8/02* (2013.01); *C23C 8/04* (2013.01); *C23C 8/30* (2013.01); *C23C 8/32* (2013.01); *C23C 8/36* (2013.01); *C23C 8/38* (2013.01); *C23C 8/58* (2013.01); *F16D 65/10* (2013.01); *F16D 2200/0008* (2013.01)

(58) Field of Classification Search
CPC .......... F16D 65/09; F16D 65/12; F16D 69/02; F16D 51/48; C23C 8/04
USPC ...................................... 188/251 M, 218 XL
See application file for complete search history.

(56) References Cited

U.S. PATENT DOCUMENTS 6,524,681 B1 * 2/2003 Seitz ........................ D06N 7/00
                                                              104/18
6,585,089 B1 * 7/2003 Parker .................... F16D 65/092
                                                              188/218 XL
8,287,667 B2    10/2012 Holly et al.
(Continued)

FOREIGN PATENT DOCUMENTS

CN         101096986 A      1/2008
CN         102308112 A      1/2012
(Continued)

OTHER PUBLICATIONS

Chinese Office Action dated Sep. 2, 2016; Application No. 201410730584.8; Applicant: GM Global Technology Operations LLC; 6 pages.

*Primary Examiner* — Christopher Schwartz
(74) *Attorney, Agent, or Firm* — BrooksGroup (57) ABSTRACT

One variation includes a friction material and method of manufacture thereof wherein the friction material includes a transfer layer on a ferritically nitrocarburized component, wherein the transfer layer may be fabricated from glass, rubber, carbon, aramid fiber, filler material, abrasive, or a high-temperature resin.

9 Claims, 7 Drawing Sheets

(56) References Cited

U.S. PATENT DOCUMENTS

| | | | |
|---|---|---|---|
| 8,877,296 B2* | 11/2014 | Lembach | F16D 65/127 |
| | | | 427/331 |
| 2003/0089564 A1* | 5/2003 | Uehara | C25D 11/36 |
| | | | 188/218 XL |
| 2006/0272909 A1* | 12/2006 | Fuller | C23C 4/04 |
| | | | 188/251 A |
| 2009/0321210 A1* | 12/2009 | Tung | F16D 13/648 |
| | | | 192/70.14 |
| 2011/0079326 A1 | 4/2011 | Hanna et al. | |
| 2011/0165331 A1* | 7/2011 | Barth | B05D 5/08 |
| | | | 427/406 |
| 2011/0297495 A1 | 12/2011 | Hanna et al. | |
| 2013/0000787 A1 | 1/2013 | Holly et al. | |
| 2014/0332330 A1* | 11/2014 | Orr | C25D 13/14 |
| | | | 188/218 XL |

FOREIGN PATENT DOCUMENTS

| | | |
|---|---|---|
| CN | 102732820 A | 10/2012 |
| JP | S5511181 A | 1/1980 |
| JP | 2007247868 A | 9/2007 |

* cited by examiner

FRICTION MATERIAL AND METHODS OF MAKING AND USING THE SAME

TECHNICAL FIELD

The field to which the disclosure generally relates to includes friction materials and methods of manufacture and use thereof.

BACKGROUND

Friction materials such as brake pads that interact with brake rotors and brake drums may be used in a vehicle braking system. A friction material with a high coefficient of friction with the brake component may be desired for improved output, durability, and performance of the brake system.

SUMMARY OF ILLUSTRATIVE VARIATIONS OF THE INVENTION

One variation of the invention shows a product comprising a rotational member wherein the rotational member may be ferritically nitrocarburized, the rotational member comprising a friction surface configured for braking engagement with a corresponding friction material, and a transfer layer disposed at the friction surface wherein the transfer layer comprises at least one of glass, rubber, carbon, aramid fiber, filler material, abrasive, or high-temperature resin.

Another variation of the invention shows a method comprising a providing a rotational member, nitrocarburizing the friction surface wherein the friction surface comprises a porous oxide layer, providing a friction material, Frictionally engaging the friction surface with the friction material wherein the frictional engagement forms a transfer layer at the friction surface, wherein the transfer layer comprises at least one of glass, rubber, carbon, aramid fiber, filler material, abrasive, or high-temperature resin.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
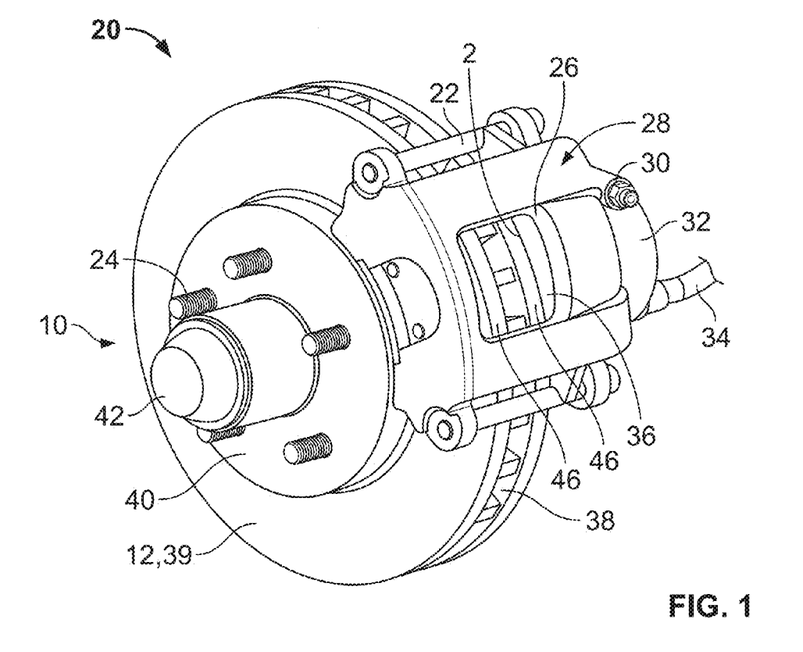
FIG. 1 is a perspective view of a disc brake assembly containing a friction material.

A friction material 2 is provided in FIG. 1. Such a friction material may be useful in brake components. A brake 10 may be an energy conversion system used to retard, stop, or hold a vehicle. In some embodiments a brake 10 may be used to retard, stop, or hold at least one wheel of a wheeled vehicle with respect to a surface. A vehicle brake 10 may be a disc brake 20, drum brake 50, a combination thereof, or may be another type. In a disc brake 20, as shown in FIG. 1, a rotational member 12 may be removably attached to a wheel at a wheel hub 40 and may be known as the brake rotor 39. The brake rotor 39 may include a single annular disc portion or may include two annular disc portions with spaced apart vanes extending therebetween to produce vent slots 38 to improve cooling. When hydraulic fluid may be pressurized in a brake hose 34, a piston inside a piston housing 32 of a caliper 28, causes the caliper 28 to squeeze the brake rotor 39 between brake pads 36. The brake pads 36 may include a friction material 2 that contacts a frictional surface 46 of the brake rotor 39 when the disc brake 20 may be engaged. The kinetic energy of the moving vehicle may be converted to heat by friction between the brake pads 36 and the brake rotor 39. Some heat energy may temporarily raise the temperature of the brake rotor 39.

Figure 2:
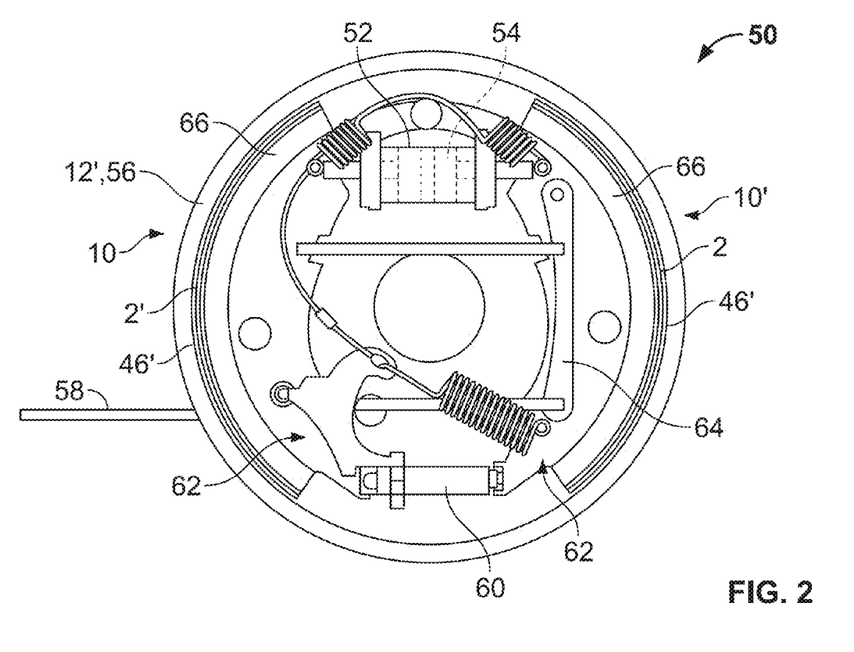
FIG. 2 is a side view of a drum brake assembly containing a friction material.

Referring to FIG. 2, a drum brake 50 is shown. The rotational member 12' may be a brake drum 56. The brake drum 56 may be removably fastened to a wheel and include fins 68 to improve cooling and increase stiffness of the brake drum 50. When hydraulic fluid may be pressurized in a wheel cylinder 52, a piston 54 causes the brake shoes 62 to press a brake lining 66 against a friction surface 46' of the brake drum 56, causing engagement of the drum brake 50. The brake lining 66 may be a friction material 2'. Alternatively, a drum brake 56 may be engaged mechanically by actuating an emergency brake lever causing the brake shoes 62 to press the brake lining 66 of the brake drum 56. When engaged, the kinetic energy of the moving vehicle may be converted to heat by friction between the brake lining 66 and the brake drum 56. Some heat energy may temporarily raise the temperature of the brake drum 56.

Figure 3:
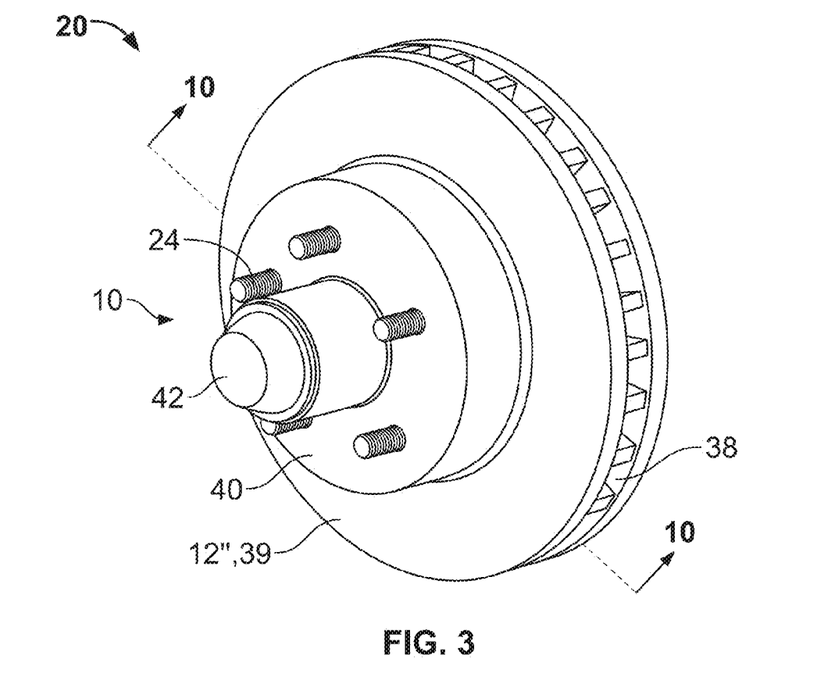
FIG. 3 is a perspective view of a drum-in-hat rotational member.

A disc brake 20 may be combined with a drum brake. As shown in FIG. 3, a drum-in-hat rotational member 12" may be included in combination. In a drum-in-hat brake, small brake shoes may be mechanically/cable actuated as an emergency brake while the flange portion acts as a typical disc brake.

The brake rotational member 12, 12', 12" includes a friction surface 46, 46' that engages the friction material 2, 2' of the brake pad 36 or brake shoe 62. As the brake may be engaged, mechanical wear and heat may cause a small amount of the friction surface 46, 46' and the friction material 2, 2' to wear away. It may be possible to reduce the rate of wear of the rotational member friction surface 46, 46' or the friction material 2, 2' by reducing the coefficient of friction between the two, but a lower coefficient of friction may make the brake less effective at engagement and retarding, holding, or stopping the vehicle.

The brake disc 29 or drum 56 may be made of a gray cast iron, stainless steel, steel, or another similar functioning material or polymer and may be ductile. It may be understood that the brake disc 29 or drum 56 may be cast, stamped, forged, formed from powdered metal or any suitable forming process. It may be understood that in the production of the brake disc 39 or drum 46, graphite flakes may be embedded in the friction surface 46, 46'. Graphite flakes may account for machinability, wear resistance, damping capacity, low shrinkage characteristics during solidification, and generally higher thermal conductivity during operation. The graphite flakes may be initiation sites for corrosion as they may be dislodged and cause exposure of the friction surfaces 46, 46', leading to pitting and roughness. The graphite flakes may also cause corrosion on the corresponding friction material 2, 2' of the brake pad 36 or brake lining 66. It may be understood that graphite generally has high lubricity when interposed between sliding surfaces. Furthermore, this lubricity may reduce the coefficient of friction between the friction material 2, 2' and the friction surface 46, 46' during brake engagement.

Figure 4:
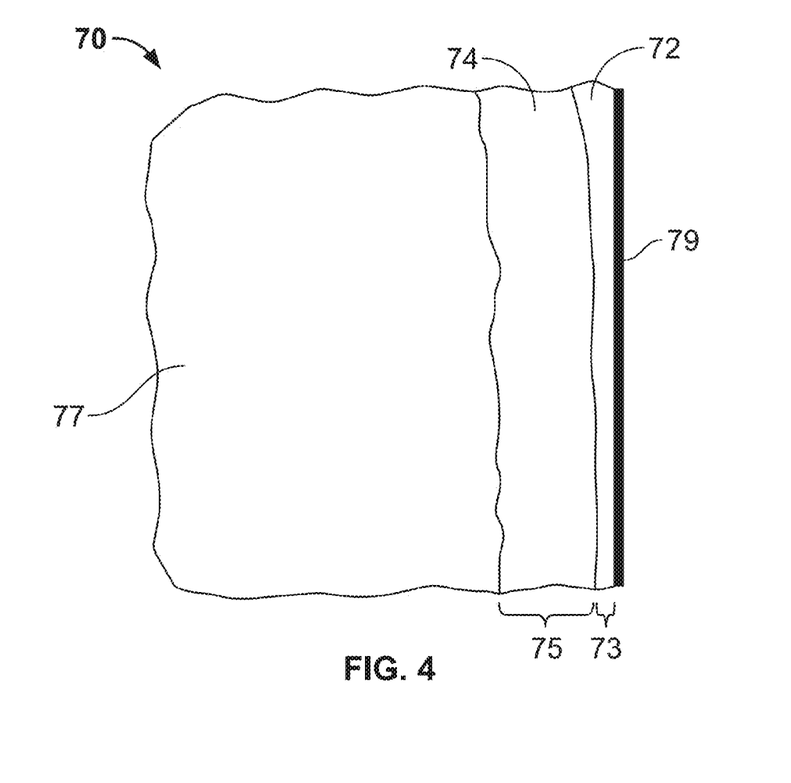
FIG. 4 is a schematic depiction of a sectional view showing the transfer layer on the compound layer in an example of the present disclosure at a microscopic enlargement.

Ferritic nitrocarburization (FNC) has been used to produce a friction surface 46, 46' that may be case hardened and resistant to corrosion and wear. Ferritic nitrocarburization may be used to dispose a compound zone 70 on the rotational member 12, 12', 12" at the friction surface 46, 46', as shown in FIG. 4. It may be understood that the rotational member 12, 12', 12" does not need to be used in braking, but can be any rotational member. Some variations include clutch pack discs, or other components capable of ferritic nitrocarburization. The basic process may involve nitrocarburization of cast iron ferrous brake rotors. In one variation, the rotational member 12, 12', 12" may be pre-heated in air and then immersed in a molten nitrocarburizing salt bath at an elevated, subcritical temperature for a predetermined time. Next, the rotational member 12, 12', 12" may be removed and directly immersed in an oxidizing salt bath at a moderately lower temperature than the nitrocarburizing salt bath for a second dwell time. Next, the rotational member 12, 12', 12" may be removed and further cooled to room temperature using water application or slow cooling in air. This compound zone 70 may be an outer portion of ferrous material formed initially through reaction between the iron of the ferrous material and nitrogen and carbon species that may be present in the nitrocarburizing salt bath. Variations of ferritic nitrocarburization can be found in U.S. Patent App. No.: 2013/0000787A1. In other variations, the rotational member 12, 12', 12" may be ferritically nitrocarburized through a gas nitrocarburization process, a plasma nitrocarburizing process, or may be done another way. The compound zone 70 may comprise a iron nitride layer 74 comprising epsilion iron nitride, $Fe_3N$ and a smaller volume of gamma prime iron nitride $Fe_4N$ formed from the nitrocarburizing salt bath, gas process or other process as well as a surface oxide layer 72 may be formed during immersion into the oxidizing salt bath or in another oxidizing atmosphere or environment, wherein the oxide layer 72 may be comprised of oxidized nitrocarburized iron, $Fe_3O_4$. In a number of variations the compound zone 70 may have a thickness ranging from 5 to 30 microns, and the oxide layer 72 may have a thickness ranging from 10 to 50% of compound zone. A diffusion layer 77 may be subjacent the iron nitride layer 74 and may be a transition between the iron nitride layer 74 and a portion of the rotational member that may be beyond the reach of ferritic nitrocarburization. The iron nitride layer 74 may have a low coefficient of friction. The concentration of nitrogen in the diffusion layer 77 may be less than the concentration of nitrogen in the iron nitride layer 74 of the compound zone 70 below the oxide layer 72. The oxide layer 72 may have a higher porosity than the iron nitride layer 74. The surface 75 of the iron nitride layer 74 may be substantially free of graphite flakes or may have no exposed graphite flakes.

As the friction material 2, 2' and the friction surface 46, 46' of the rotational member 12, 12', 12" come into contact during a brake engagement, a complex tribological interface arises that can have significant influence on brake performance. The friction surface 46, 46' may be case hardened as a result of the ferritic nitrocarburization and brake performance may be a function of the friction material 2, 2' selected and its resulting interaction with the friction surface 46, 46'. The friction material 2, 2' may be made of asbestos, organic, ceramic, or semi-metallic material or may be another type. In certain variations ceramic compounds, copper fibers, aramid fibres, or other polymeric materials may also be used in the friction material 2, 2'. Semi-metallic brake pads may include steel wool or wire, iron powder, copper, graphite, inorganic fillers, or may include other similar functioning materials. Non-Asbestos organic brake pads may include glass, rubber, carbon, Kevlar, filler materials, high-temperature resins, abrasives, or may include other similar functioning materials. Such high-temperature resins may include polyimides, bezoxazines, bismaleimides, phenols, cyanate esters, or a similar functioning material. Such filler materials may include a barite, a lime, a metal sulfide, steel wool, potassium titanate, or a similar functioning material. Such abrasives may include brass chips, bituminous coal, fiberglass, metal oxide, a mineral, or a similar functioning material. Ceramic brake pads may include ceramic fibers, nonferrous filler materials, bonding agents, metal fillers, or may include other similar functioning materials. The friction material 2, 2' may be made of aggressive and softer compounds or may fall on a scale all the way to non-aggressive and harder, more durable compounds. The compounds chosen for the friction materials can be changed according to personal tastes, driving styles, operating temperatures, or variation in brake fading.

Figure 5:
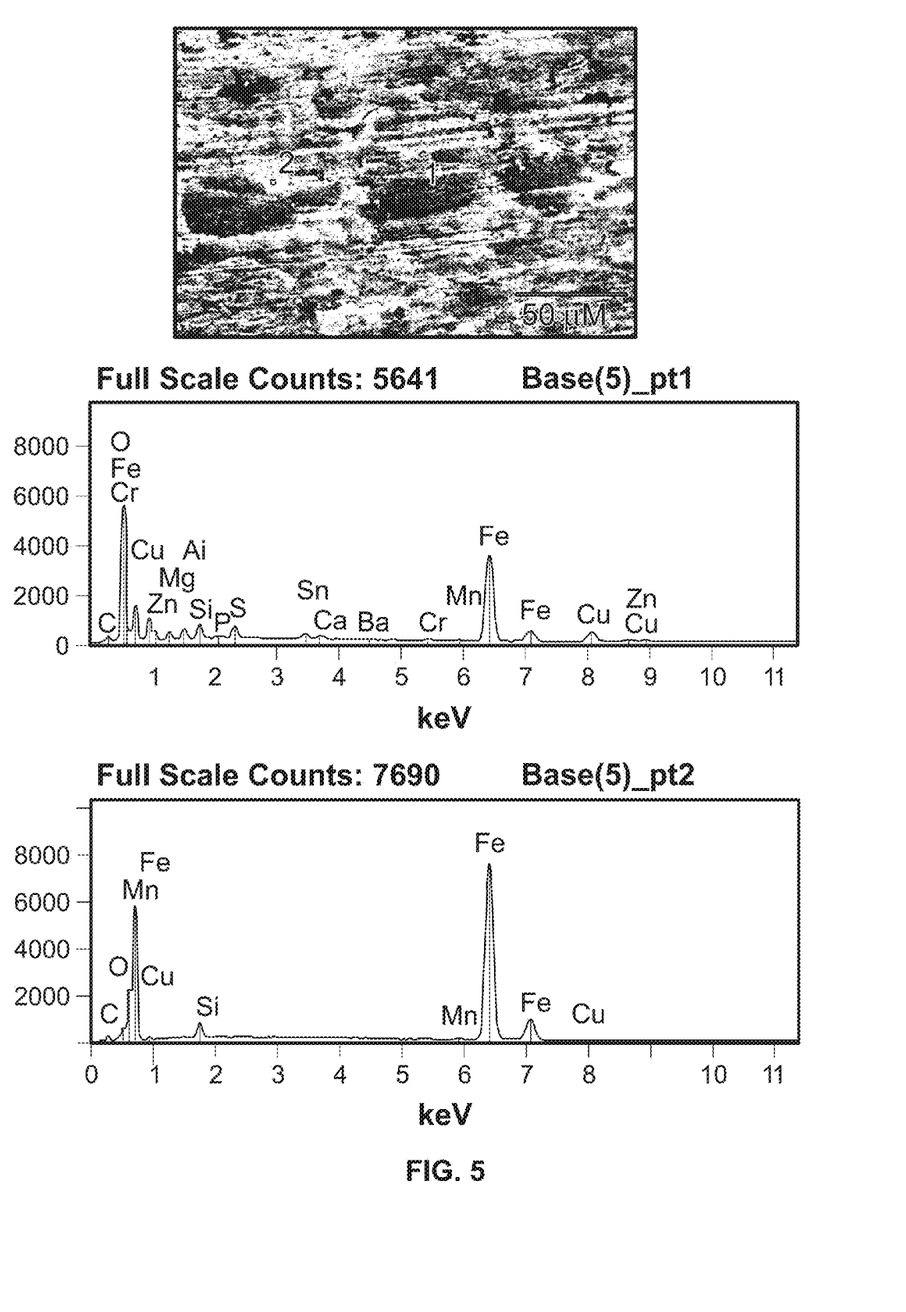
FIG. 5 is an EDS spectra of a friction material according to two variations of a friction material.
Figure 6:
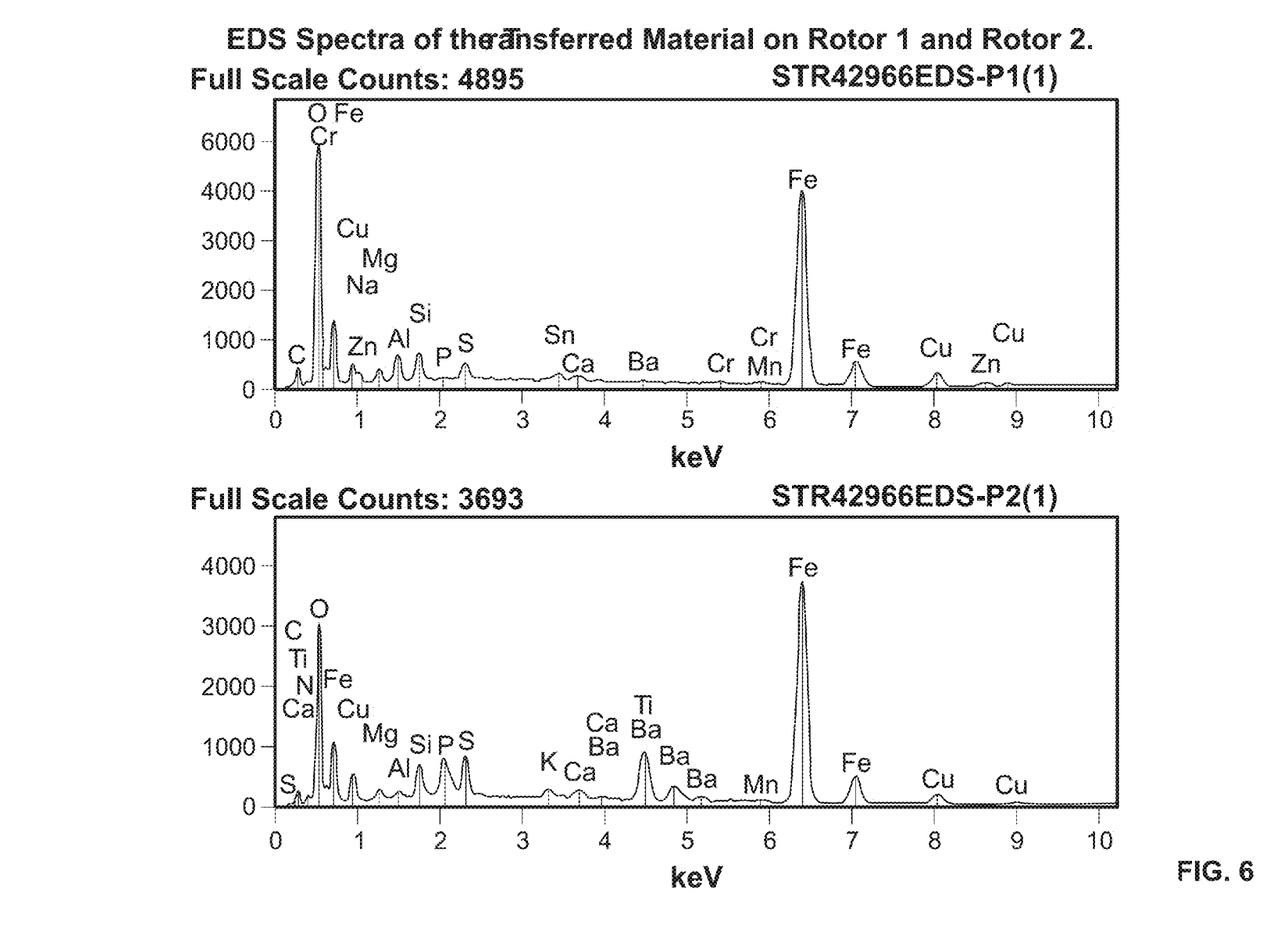
FIG. 6 is an EDS spectra of a friction material according to two variations of a friction material.
Figure 7:
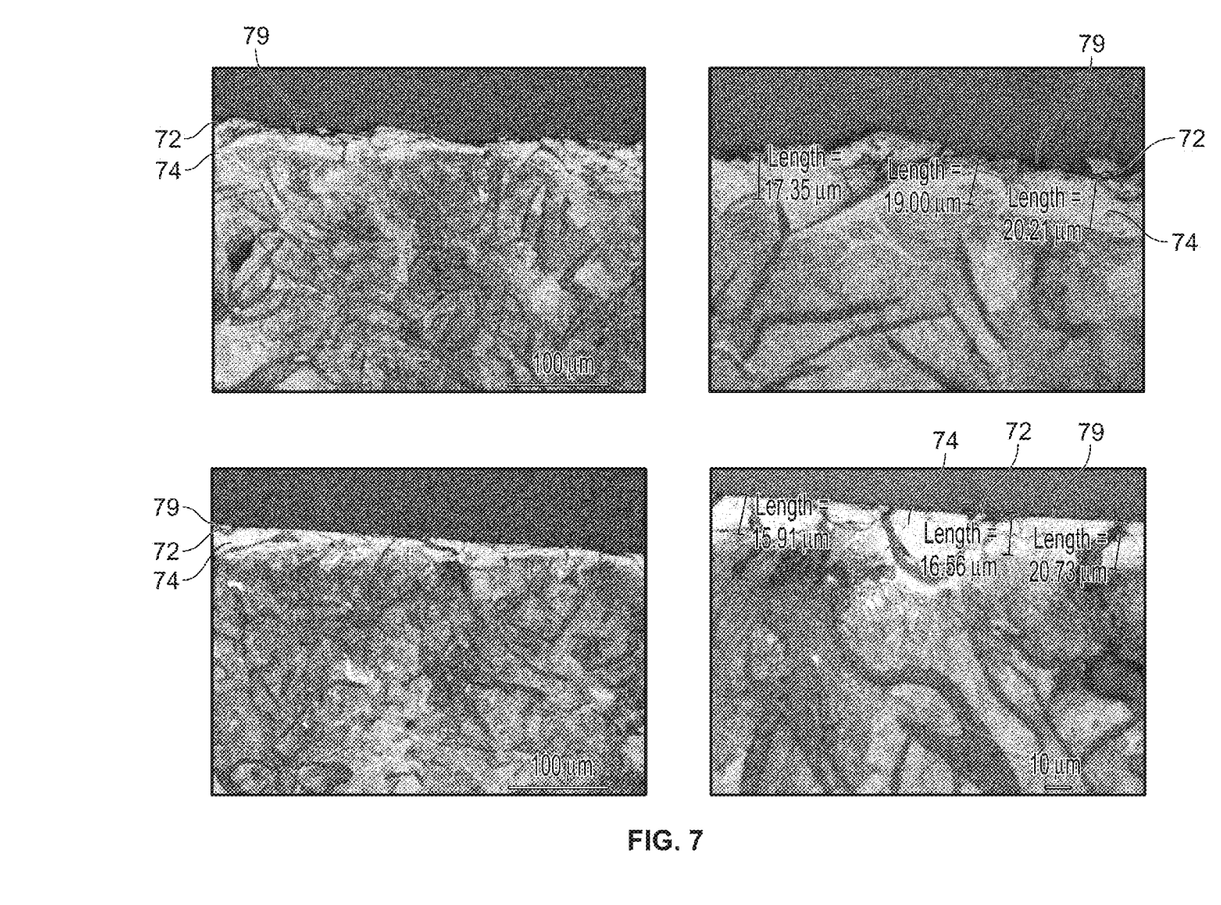
FIG. 7 is a photomicrograph showing two variations of a friction material on a FNC brake rotor.
Figure 8:
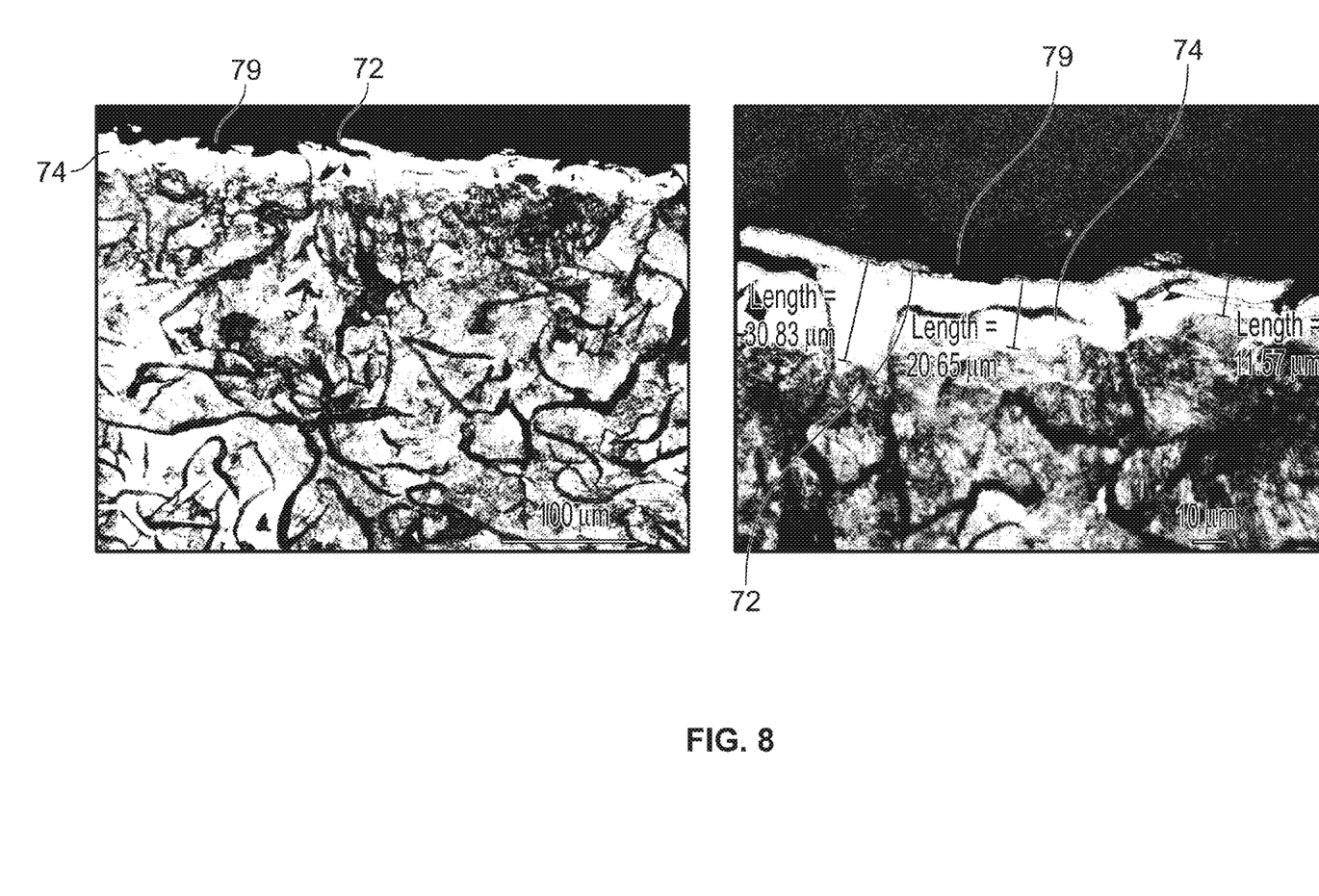
FIG. 8 is a photomicrograph showing two variations of a friction material on an FNC brake rotor.
Figure 9:
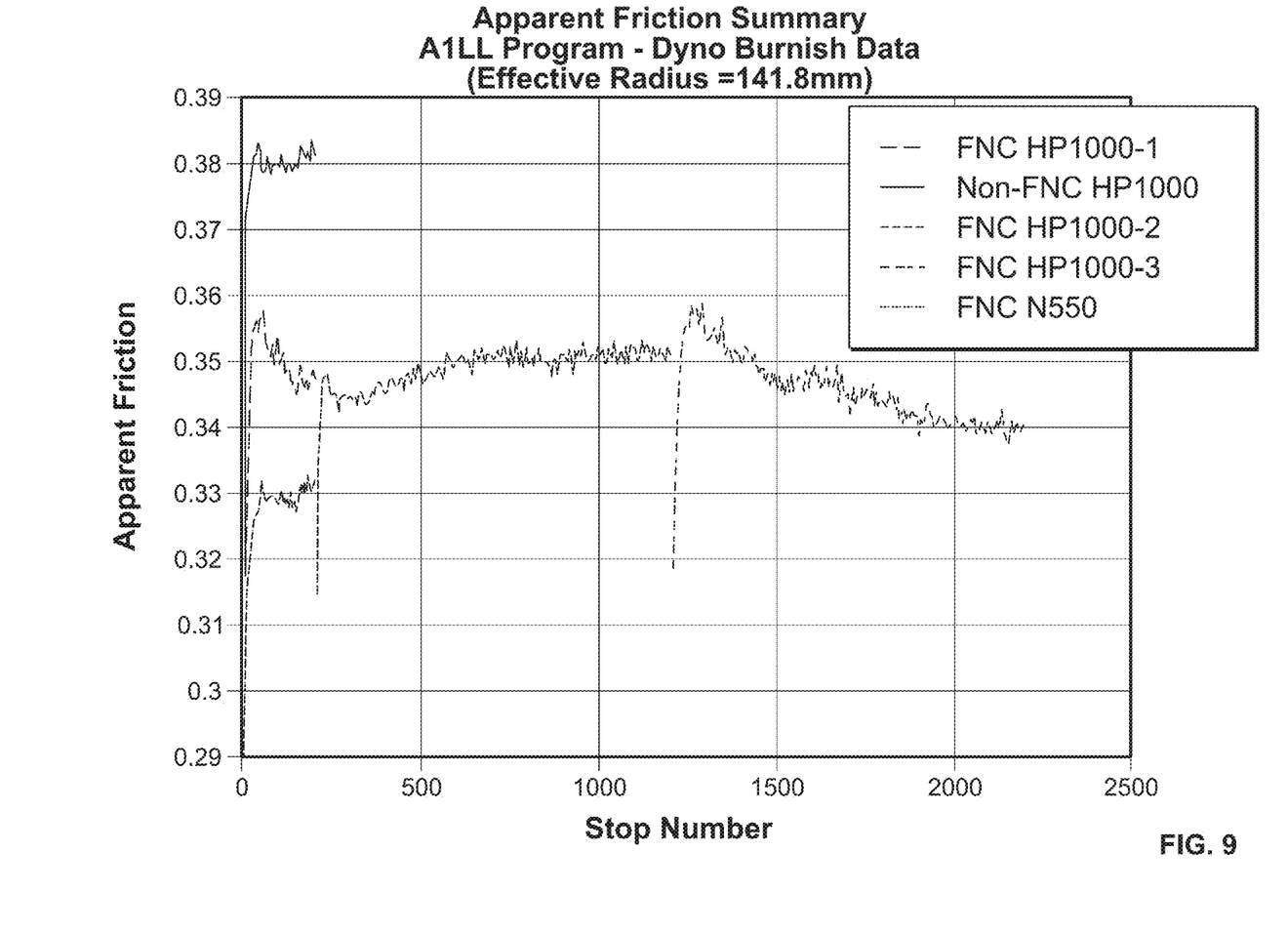
FIG. 9 is a graph comparing apparent friction vs. stop number results for 4 variations of the present disclosure on FNC rotors and a prior art non-FNC brake rotor.

In one variation, a non-aggressive non-asbestos organic (NAO) lining used in the friction material 2, 2' may be found to develop a transfer layer 79 on a FNC friction surface 46, 46' after brake engagement. Referring again to FIG. 4, the transfer layer 79 may be developed as early as the initial brake engagement. The transfer layer 79 may comprise glass, rubber, carbon, Kevlar, filler materials, high-temperature resins, or may include other similar functioning materials. More specifically, FIGS. 5-6 show EDS spectra of the transferred material. FIGS. 7-8 show photographs of the transfer layer 79 on the FNC friction surface 46, 46'. In a number of variations the thickness of the transfer layer 79 may be at least 10% the thickness of the iron nitride layer 74. In a number of variations the thickness of the transfer layer may be between 10% and 50% the thickness of the iron nitride layer 74. In a number of variations the thickness of the transfer layer 79 may be 0-20 μm. The transfer layer 79 may increase the apparent friction coefficient of the FNC friction surface 46, 46'. FIG. 9 shows a graph comparing the apparent friction coefficient versus the number of stops from 60 miles per hour of a vehicle down to 0 miles per hour for FNC and Non-FNC brake rotors with NAO lining transfer layers 79. The transfer layer 79 may increase the apparent friction coefficient of the FNC friction surface 46, 46' into a range from 0.33 to 0.36.

A method 100 for increasing the useful life of a rotational member 12, 12', 12" of a vehicle brake 10 is disclosed herein and shown schematically in FIG. 12. The method includes a step 110 of removing graphite flakes from a frictional surface 46, 46' of the rotational member 12, 12', 12" of a vehicle brake 10. Removing the graphite flakes may be accomplished by a process including sand blasting, grit blasting, grinding, and combinations thereof or may be done another way. After the graphite has been removed according to method 100, at least the friction surface 46, 46' of the rotational member 12, 12', 12" may be nitrocarburized in a step 120. It may be understood that the nitrocarburizing includes a gas nitrocarburizing process, plasma nitrocarburizing process, or salt bath nitrocarburizing process. It may be understood that removal of the graphite flakes before nitrocarburization may prevent the graphite from masking any areas from nitrocarburization. The rotational member 12, 12', 12" may have a frictional surface 46, 46' placed in frictional engagement with the friction material 2,2' in a step 130. This method may form a transfer layer 79 on the frictional surface 46, 46' of the rotational member 12, 12', 12" in a step 140. In a number of variations, the formation of the transfer layer may be examined by surface analysis and Scanning Electron Microscopy Energy Dispersive Spectroscopy to verify transfer layer properties. In a number of variations the thickness of the transfer layer 79 may be at least 10% the thickness of the iron nitride layer 74. In a number of variations the thickness of the transfer layer may be between 10% and 50% the thickness of the iron nitride layer 74. In a number of variations the thickness of the transfer layer 79 may be 0-20 µm. The transfer layer 79 may increase the apparent friction coefficient of the FNC friction surface 46, 46'. The transfer layer 79 may increase the apparent friction coefficient of the FNC friction surface 46, 46' into a range from 0.33 to 0.36. This apparent friction coefficient may stay within this range from stop 1 to stop 2500.

The rotational member 12, 12', 12" may be formed from iron, steel or stainless steel using the method 100 above. It may be understood that the rotational member 12, 12', 12" may include a brake disc 39, brake drum 50, a drum-in-hat, a combination thereof, or may be another type. Some variations include clutch pack discs, or other components capable of ferritic nitrocarburization. The rotational member 12, 12', 12" formed using the disclosed method may have a higher apparent friction coefficient than an FNC rotational member 12, 12', 12" that does not have a transfer layer 79. The FNC rotational member 12, 12', 12" may maintain its reduced wear of its corresponding friction material 2, 2'.

Numerical data have been presented herein in a range format. It may be understood that this range format is used merely for convenience and brevity and should be interpreted flexibly to include not only the numerical values explicitly recited as the limits of the range, but also to include all the individual numerical values or sub-ranges encompassed within the range as if each numerical value and sub-range is explicitly recited.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including a rotational member of a vehicle brake wherein the rotational member is ferritically nitrocarburized, the rotational member including a friction surface configured for braking engagement with a corresponding friction material; and a transfer layer disposed at the friction surface wherein the transfer layer includes at least one of glass, rubber, carbon, aramid fiber, filler material, abrasive, or high-temperature resin.

Variation 2 may include a product as set forth in Variation 1 wherein the rotational member includes one of a brake drum, a disc brake rotor, a drum-in-hat, or a combination thereof.

Variation 3 may include a product as set forth in any of Variations 1-2 wherein the rotational member further includes iron, steel, or stainless steel.

Variation 4 may include a product as set forth in any of Variations 1-3 wherein the transfer layer exhibits an apparent friction coefficient between 0.33 and 0.36.

Variation 5 may include a product as set forth in any of Variations 1-4 wherein the transfer layer has a thickness ranging between 1 and 20 µm.

Variation 6 may include a product as set forth in any of Variations 1-5 wherein the high-temperature resin further includes at least one of polyimides, bezoxazines, bismaleimides, phenols, or cyanate esters.

Variation 7 may include a product as set forth in any of Variations 1-6 wherein the filler material further includes at least one of a barite, a lime, a metal sulfide, steel wool, or potassium titanate.

Variation 8 may include a product as set forth in any of Variations 1-7 wherein the abrasive further includes at least one of brass chips, bituminous coal, fiberglass, metal oxide, or a mineral.

Variation 9 may include a method including providing a rotational member, nitrocarburizing the friction surface wherein the friction surface forms a porous oxide layer, providing a friction material, frictionally engaging the friction surface with the friction material wherein the frictional engagement forms a transfer layer at the friction surface wherein the transfer layer includes at least one of glass, rubber, carbon, aramid fiber, filler material, abrasive, or high-temperature resin.

Variation 10 may include a method as set forth in Variation 9 wherein the formation of the transfer layer is examined by surface analysis and Scanning Electron Microscopy Energy Dispersive Spectroscopy to verify transfer layer properties.

Variation 11 may include a method as set forth in any of Variations 9-10 wherein nitrocarburizing includes a gas nitrocarburizing process, a plasma nitrocarburizing process, or a salt bath nitrocarburizing process.

Variation 12 may include a method as set forth in any of Variations 9-11 wherein the rotational member is formed from gray cast iron, steel, or stainless steel.

Variation 13 may include a method as set forth in any of Variations 9-12 wherein the rotational member includes a brake rotor, a brake drum, a drum-in-hat, or a combination thereof.

Variation 14 may include a method as set forth in any of Variations 9-13 wherein the transfer layer exhibits an apparent friction coefficient between 0.33 and 0.36.

Variation 15 may include a method as set forth in any of Variations 9-14 wherein the transfer layer has a thickness greater than 0 µm and less than 10 µm.

Variation 16 may include a method as set forth in any of Variations 9-15 wherein the high-temperature resin further includes at least one of polyimides, bezoxazines, bismaleimides, phenols, or cyanate esters.

Variation 17 may include a method as set forth in any of Variations 9-16 wherein the filler material further includes at least one of a barite, a lime, a metal sulfide, steel wool, or potassium titanate.

Variation 18 may include a method as set forth in any of Variations 9-17 wherein the abrasive includes at least one of brass chips, bituminous coal, fiberglass, metal oxide, or a mineral.

Variation 19 may include a method as set forth in any of Variations 9-18 wherein the transfer layer has a thickness ranging between 10 and 20 μm.

Variation 20 may include a method as set forth in any of Variations 9-19 wherein the oxide layer includes oxidized nitrocarburized iron of the formula $Fe_3O_4$.

Variation 21 may include a product as set forth in any of Variations 1 and 3-8 wherein the rotational member includes a clutch pack disc.

Variation 22 may include a product as set forth in any of Variations 1-8 and 21 wherein the rotational member is ductile.

Variation 23 may include a product or method as set forth in any of Variations 1-22 wherein the rotational member is stamped, cast, forged, or formed from powdered metal.

Variation 24 may include a product as set forth in any of Variations 1-8 wherein the rotational member includes a compound zone that includes an iron nitride layer, an oxide layer, and a diffusion layer.

Variation 25 may include a product as set forth in Variation 24 wherein the iron nitride layer comprises $Fe_3N$ and $Fe_4N$.

Variation 26 may include a product or method as set forth in Variations 1-25 wherein the transfer layer includes asbestos, ceramic, or semi-metallic material.

Variation 27 may include a product or method as set forth in Variations 24-26 wherein the transfer layer may be between 10 and 50% the thickness of the iron nitride layer.

Variation 28 may include a product or method as set forth in Variations 24-26 wherein the oxide layer has a higher porosity than the iron nitride layer.

The above description of select examples of the invention is merely exemplary in nature and, thus, variations or variants thereof are not to be regarded as a departure from the spirit and scope of the invention.

What is claimed is:

1. A product comprising:
a rotational member wherein the rotational member is ferritically nitrocarburized to provide a compound zone comprising an iron nitride layer and an overlying porous oxide layer, the rotational member comprising a friction surface configured for braking engagement with a corresponding friction material; and the rotational member further comprising a transfer layer disposed on the porous oxide layer so that the rotational member has a higher apparent coefficient of friction than a rotational member without the transfer layer on the porous oxide layer, wherein the transfer layer comprises at least one of glass, rubber, carbon, aramid fiber, filler material, abrasive, or high-temperature resin.

2. A product as defined in claim 1 wherein the rotational member comprises one of a brake drum, a disc brake rotor, a drum-in-hat, or a combination thereof.

3. A product as defined in claim 1 wherein the rotational member further comprises iron, steel, or stainless steel.

4. A product as defined in claim 1 wherein the transfer layer exhibits an apparent friction coefficient between 0.33 and 0.36.

5. A product as defined in claim 1 wherein the transfer layer has a thickness ranging between 1 and 20 μm.

6. A product as set forth in claim 1 wherein the iron nitride layer comprising epsilon iron nitride, and wherein the compound zone has a thickness of 5-30 microns.

7. A product comprising: a rotational member wherein the rotational member is ferritically nitrocarburized, the rotational member comprising a friction surface configured for braking engagement with a corresponding friction material; and the rotational member further comprising a transfer layer disposed at the friction surface so that the rotational member has a higher apparent coefficient of friction than a rotational member without the transfer layer, and wherein the transfer layer comprises at least one of polyimides, bezoxazines, bismaleimides, phenols, or cyanate esters.

8. A product comprising: a rotational member wherein the rotational member is ferritically nitrocarburized, the rotational member comprising a friction surface configured for braking engagement with a corresponding friction material; and the rotational member further comprising a transfer layer disposed at the friction surface so that the rotational member has a higher apparent coefficient of friction than a rotational member without the transfer layer, and wherein the transfer layer comprises at least one of a barite, a lime, a metal sulfide, steel wool, or potassium titanate.

9. A product comprising: a rotational member wherein the rotational member is ferritically nitrocarburized, the rotational member comprising a friction surface configured for braking engagement with a corresponding friction material; and the rotational member further comprising a transfer layer disposed at the friction surface so that the rotational member has a higher apparent coefficient of friction than a rotational member without the transfer layer, and wherein the transfer layer comprises at least one of brass chips, or bituminous coal.

* * * * *